Nov. 13, 1923.

W. S. HAMM

DOOR LATCH

Filed March 13, 1922

1,474,028

Inventor:
William S. Hamm
By Tilson Gilson
Attys.

Patented Nov. 13, 1923.

1,474,028

UNITED STATES PATENT OFFICE.

WILLIAM S. HAMM, OF HUBBARD WOODS, ILLINOIS, ASSIGNOR TO THE ADAMS & WEST-LAKE COMPANY, A CORPORATION OF ILLINOIS.

DOOR LATCH.

Application filed March 13, 1922. Serial No. 543,316.

*To all whom it may concern:*

Be it known that I, WILLIAM S. HAMM, a citizen of the United States, and a resident of Hubbard Woods, county of Cook, and State of Illinois, have invented certain new and useful Improvements in Door Latches, of which the following is a specification, and which are illustrated in the accompanying drawings, forming a part thereof.

The invention relates to door latches of the type in which the keeper-engaging dog (commonly called a swinging latch) is pivoted within an aperture in the face plate of a casing and is retracted by means of a bar operated by a spindle.

The objects of the invention are to provide an improved form of connection between the retracting bar and the dog, whereby the strength of the parts is increased and their assembly is facilitated; and to provide stops for limiting the forward swing of the dog and to relieve the actuating elements from the severe strains due to pressure upon the outer side of the door when the dog is engaged with the keeper.

The invention consists in the structure as hereinafter described, and as illustrated in the accompanying drawings, in which—

Figure 1:
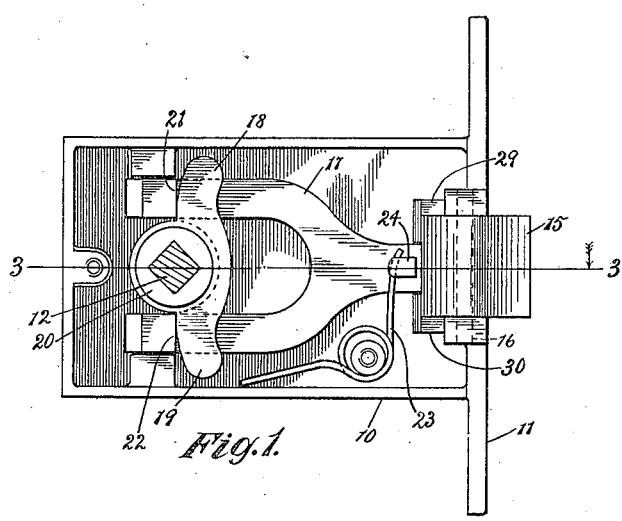
Fig. 1 is an elevation of the latch, the inner face of its casing being removed and the spindle being shown in section.
Figure 2:
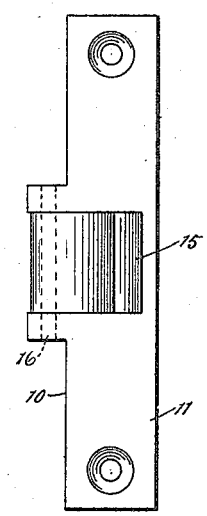
Fig. 2 is an end view of the latch.
Figure 3:
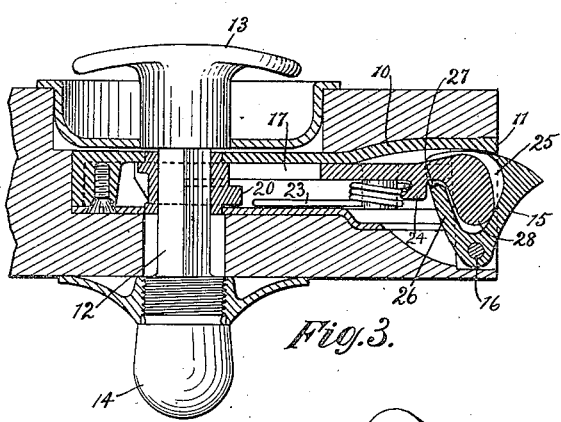
Fig. 3 is a sectional view on the line 3—3 of Fig. 1.
Figure 4:
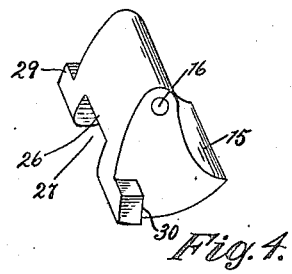
Fig. 4 is a view in perspective of the dog.
Figure 5:
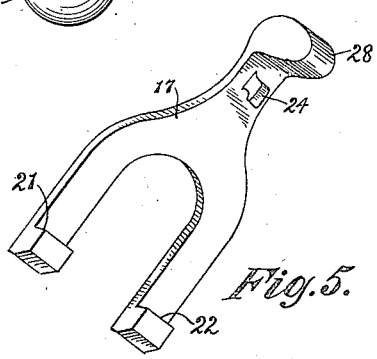
Fig. 5 is a view in perspective of the dog retracting bar.

As illustrated the latch is of the mortise type having a casing 10, adapted to enter a suitable aperture in the edge face of the door, the casing being provided with a face plate 11 which fits against and is usually set flush with the edge of the door. The usual square spindle 12 is provided to which are attached inner and outer handles 13, 14, of any preferred form.

The dog 15 occupies an aperture in the face plate 11, and is pivoted, as shown at 16, to the side walls of this aperture. A retracting bar 17 engages the dog, and is actuated by a pair of arms 18, 19, carried by a hub 20 fitting on the spindle 12, and being engageable with a pair of shoulders 21, 22, formed on the two branches of the rearward end of the bar. A spring 23, reacting between a portion of the casing 10 and a lug 24 formed on the bar 17, normally holds the dog 15 in advanced position.

The dog 15 is, as usual, substantially sector-shaped, its body being chambered, as shown at 25, and its rearward wall 26 having near its outer end an aperture 27, into which the forward end of the bar 17 is entered, this bar having a lateral lug or hook 28 for engaging the inner surface of the rear wall 26.

The side walls of the aperture in the face plate 11 are preferably extended backwardly beyond the thickness of the body of the plate, to provide ample stock for receiving the pivot 16. Lateral stop lugs 29, 30 are formed on the dog adjacent the outer margin of the wall 26, and engage the inner edges of the marginal walls of the aperture within which the dog is pivoted. The inner portion of the peripheral face of the dog is apertured to permit the entry of the lug 28.

In latches of this type difficulty has been found in providing a form of attachment of the retracting bar to the dog which would permit the easy assembly of the parts and would withstand severe shocks of service. Such latches have been easily broken, also, upon the application of force tending to open the door with the dog in engagement with the keeper, the application of such force being resisted only by the dog-operating mechanism.

In the improved latch the dog and retracting bar are readily assembled by inserting the lug 28 into the aperture in the rear and peripheral walls of the dog, and when assembled the lug 28 engages the inner face of the rear wall of the dog, and upon being moved backwardly upon turning the spindle will withdraw the dog from the keeper in opposition to the spring 23. The dog 15 is swung forwardly by pressure of the lug 28 against its front wall, under the influence of the spring 24. This form of construction makes it possible to give the bar and its dog-engaging element ample strength to resist the strains put upon them by the application of extreme force to the door knobs or handles. The lateral lugs 29, 30, limit the forward movement of the dog and sustain the stresses due to the application of force for opening the door while the dog is advanced, entirely relieving the operating elements of this duty.

While a preferred form of construction is disclosed, various changes of detail may be made without departing from its scope. For example, the particular contour of the dog is not important, it being essential only that it shall be provided with an instanding flange for engagement by a substantially hook-shaped retracting bar.

I claim as my invention—

1. In a door latch, in combination, a pivoted keeper engaging dog having a chambered body and an aperture adjacent the outer end of its rear wall, and a retracting bar having a hooked forward end projecting within the aperture, the hook engaging the rear wall of the dog.

2. In a door latch, in combination, a pivoted dog having a rearward flange disposed at an acute angle with its front face, and a retracting bar having at its forward end a lateral lug engaging the inner face of the flange.

3. In a door latch, in combination, a pivoted dog having a chambered body and an opening near the outer margin of its rear wall, and a retracting bar entering the opening and provided with a lateral lug engaging the inner face of such wall.

4. In a door latch, in combination, a casing having an apertured face plate, a dog pivoted to the side walls of the aperture and having lateral lugs engageable with the inner surface of the face plate, and means for swinging the dog.

5. In a door latch, in combination, a casing having an apertured face plate, a chambered dog having an opening adjacent the outer end of its rear wall, and lateral stop lugs for engaging the inner surface of the face plate, and a retracting bar projecting into such opening and having a lateral lug engageable with the inner face of the rear wall of the dog.

6. In a door latch, in combination, a pivoted dog having front and rear walls, an actuating bar having a lug entered between the two walls and engageable with each for opening said dog.

WILLIAM S. HAMM.